United States Patent [19]

Falender et al.

[11] Patent Number: 4,482,498

[45] Date of Patent: Nov. 13, 1984

[54] COLOR STABLE CHELATED TITANATE COMPOSITIONS

[75] Inventors: James R. Falender, Sanford; Angelika H. McHale, Midland, both of Mich.

[73] Assignee: Dow Corning Corporation, Midland, Mich.

[21] Appl. No.: 452,564

[22] Filed: Dec. 23, 1982

Related U.S. Application Data

[62] Division of Ser. No. 308,704, Oct. 5, 1981, Pat. No. 4,391,937.

[51] Int. Cl.³ .............................................. C07F 7/28
[52] U.S. Cl. .................................. 260/429.5; 523/200
[58] Field of Search ...................... 260/429.5; 523/200

[56] References Cited

U.S. PATENT DOCUMENTS

| | | | |
|---|---|---|---|
| 3,334,067 | 8/1967 | Weyenberg | 260/46.5 |
| 3,499,859 | 3/1970 | Matherly | 260/37 |
| 3,689,454 | 9/1972 | Smith et al. | 260/46.5 G |
| 3,708,467 | 1/1973 | Smith et al. | 260/185 |
| 3,856,839 | 12/1974 | Smith et al. | 260/429.5 |
| 3,926,896 | 12/1975 | Dumoulin | 260/31.2 R |
| 4,080,353 | 3/1978 | Monte et al. | 260/429.5 X |
| 4,096,110 | 6/1978 | Monte et al. | 523/200 X |
| 4,122,062 | 10/1978 | Monte et al. | 523/200 X |
| 4,261,913 | 4/1981 | Monte et al. | 260/429.5 |
| 4,277,415 | 7/1981 | Sugerman et al. | 260/429.5 |

*Primary Examiner*—Helen M. S. Sneed
*Attorney, Agent, or Firm*—Edward C. Elliott

[57] ABSTRACT

A composition containing a chelated titanium compound and an additive selected from the group consisting of (1) esters of thioalkanoic acids, (2) di-tertiary-butyl phenol containing compounds, (3) organic phosphites, and (4) mixtures of (2) and (3), retards the color change of the composition on storage. When this composition is used as the catalyst for one package, room temperature curing silicone elastomeric compositions of the type comprising a hydroxyl endblocked polydiorganosiloxane and a silane having an average of from 2.01 to 4 inclusive alkoxy radicals, the silicone elastomeric composition can be stored without substantial color formation. The improvement in reduced color change is useful in silicone elastomeric compositions which are clear or light colored.

15 Claims, No Drawings

COLOR STABLE CHELATED TITANATE COMPOSITIONS

This application is a division of application Ser. No. 308,704, filed Oct. 5, 1981 now U.S. Pat. No. 4,391,937.

BACKGROUND OF THE INVENTION

1. Field of the Invention

This invention relates to chelated titanium compounds and one package, room temperature curing silicone elastomeric compositions catalyzed with chelated titanium compounds.

2. Description of the Prior Art

A class of chelated titanium compounds has been found useful as a catalyst in the curing of one package, room temperature curing silicone elastomeric compositions. In U.S. Pat. No. 3,334,067, issued Aug. 1, 1967, Weyenberg describes a method of preparing a composition which is stable in the absence of moisture but which will cure upon exposure to moisture. The composition of Weyenberg includes beta-dicarbonyl titanium compounds of the class included in the present invention. Other beta-dicarbonyl titanium compounds are described in U.S. Pat. No. 3,689,454, issued Sept. 5, 1972, to Smith et al.

One package silicone elastomeric compositions containing such chelated titanium compounds develop color upon storage. If the composition is colored at the time it is manufactured because of the choice of filler used or because of pigments used, the change in color may not be noticeable. However, clear or translucent compositions are commercially desirable products. Chelated titanium catalysts cannot be used in such cases because the compositions develop a yellow color on storage. The development of this yellow color is not evident when other types of titanium catalysts are used, such as tetraalkoxytitanates. The tetraalkoxytitanates are often not satisfactory, however, due to other manufacturing difficulties.

SUMMARY OF THE INVENTION

Chelated titanium compounds of the class useful for the catalysis of one package, room temperature curing silicone elastomeric compositions can be prevented from causing the formation of color upon storage of the silicone elastomeric composition by adding to the chelated titanium compound an additive selected from the group consisting of certain (1) esters of thioalkanoic acids, (2) di-tertiary-butyl phenol containing compounds, (3) organic phosphites, and (4) mixtures of (2) and (3).

DESCRIPTION OF THE INVENTION

This invention relates to a composition comprising the product obtained by mixing (a) a chelated titanium compound having a formula

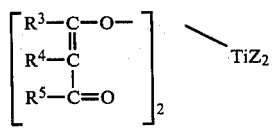

in which $R^3$ is a monovalent hydrocarbon radical having from 1 to 18 inclusive carbon atoms, $R^4$ is a monovalent radical selected from the group consisting of hydrocarbon radicals having from 1 to 18 carbn atoms, and hydrogen, $R^5$ is a monovalent radical selected from the group consisting of hydrocarbon radicals and aliphatic hydrocarbonoxy radicals each having from 1 to 18 inclusive carbon atoms, and Z is a radical selected from the group consisting of monovalent aliphatic hydrocarbonoxy radicals and monovalent acyloxy radicals, each having from 1 to 18 inclusive carbon atoms; hydroxyl radical; divalent oxygen atoms forming a TiOTi linkage; and when taken together form an alkanedioxy radical of the formula

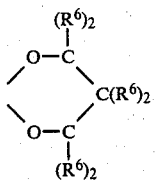

in which $R^6$ is a radical selected from the group consisting of hydrogen atom, and monovalent aliphatic hydrocarbon radicals having not more than 8 carbon atoms, the total number of carbon atoms in the alkanedioxy radical is not more than 18, and (b) from 1 to 100 parts by weight based on 100 parts by weight of (a), of an additive soluble in the chelated titanium compound and being selected from the group consisting of (1) an ester of thioalkanoic acid of the formula

wherein $R^8$ is an alkyl group containing from 1 to 15 inclusive carbon atoms and a is an integer of from 1 to 4 inclusive, (2) di-tertiary-butyl phenol containing compounds selected from the group consisting of 2,6-di-tert-butyl-4-methylphenol, tetrakis[methylene-3-(3′,5′-di-tert-butyl-4′-hydroxyphenyl)propionate]methane, octadecyl-3-(3′,5′-di-tert-butyl-4′-hydroxyphenyl)propionate, 4,4′-methylene-bis(2,6-di-tert-butylphenol), 1,6-hexamethylene-bis-(3,5-di-tert-butyl-4-hydroxyhydrocinnamate), thiodiethylene-bis-(3,5-di-tert-butyl-4-hydroxyhydrocinnamate).

(3) an organic phosphite selected from the group consisting of the formula

wherein $R^{10}$ and $R^{11}$ are selected from the group consisting of linear or branched alkyl radicals of from 1 to 18 carbon atoms, and phenyl radical, wherein b is 0 or 1, and the formula

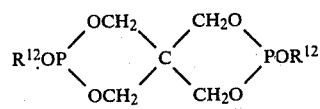

wherein $R^{12}$ is a linear or branched alkyl radical of from 1 to 18 carbon atoms, and (4) a mixture of (2) and (3), the composition having a color of less than 13 as determined by the Gardner Color Scale and being stored under conditions substantially excluding moisture.

This invention also relates to one package, room temperature curing silicone elastomeric compositions comprising a hydroxyl endblocked polydiorganosiloxane, a silane or silane mixture having an average of from 2.01 to 4 inclusive alkoxy radicals, a chelated titanium compound (a) as described above, and an additive (b) as described above, said elastomeric composition being stable under conditions excluding moixture and curable by exposure to moisture.

Chelated titanium compounds of the class described as (a) above are used as catalysts in one package, room temperature curing silicone elastomeric compositions. Such elastomeric compositions are storage stable under conditions excluding moisture but cure into a silicone rubber upon exposure to moisture, for example, when they are extruded from their storage tube and exposed to the atmosphere. Many of these elastomeric compositions are commercially available for use as caulks and adhesives. Some of these elastomeric compositions are manufactured to yield a clear or translucent silicone rubber. In such compositions, a problem has arisen in that the composition develops varying degrees of yellow color upon storage, making it impossible to obtain clear or translucent silicone rubber upon cure. It has been discovered that the color is due to the chelated titanium compounds which are used as the catalyst in these elastomeric compositions.

We have now found that the development of color upon storage can be controlled by the addition of the additives specified as (b) to the chelated titanium compound or to silicone elastomeric compositions containing the chelated titanium compound.

The chelated titanium compounds useful in this invention are those that are useful as catalysts in one package, room temperature curing silicone elastomeric compositions. The chelated titanium compounds and their method of manufacture are described in U.S. Pat. No. 3,334,067, issued Aug. 1, 1967, to Weyenberg; U.S. Pat. No. 3,689,454, issued Sept. 5, 1972, to Smith and Hamilton, Jr.; U.S. Pat. No. 3,708,467, issued Jan. 2, 1973, to Smith and Beers; and U.S. Pat. No. 3,856,839, issued Dec. 24, 1974, to Smith and Hamilton, Jr., said patents hereby being incorporated by reference to disclose chelated titanium compounds and their method of manufacture. Many of these chelated titanium compounds are commercially available.

For the purpose of this invention, $R^3$ can be a monovalent hydrocarbon radical of 1 to 18 carbon atoms, such as methyl, ethyl, propyl, isopropyl, butyl, tertiary butyl, amyl, xylyl, sec-amyl, phenyl, hexyl, cyclohexyl, octadecyl, allyl, and hexenyl. $R^4$ can be hydrogen or a monovalent hydrocarbon radical of 1 to 18 carbon atoms, such as those exemplified for $R^3$; $R^4$ when taken together with $R^3$ can form together with the carbon atoms to which there are attached cyclic hydrocarbon substituents of not more than about 12 carbon atoms, such as represented by the formula

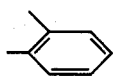

$R^5$ can be a monovalent hydrocarbon radical of 1 to 18 carbon atoms, such as those exemplified for $R^3$ or a monovalent aliphatic hydrocarbonoxy radical of 1 to 18 carbon atoms, such as methoxy, ethoxy, isopropoxy, allyloxy, propoxy, tertiary butoxy, hexoxy, sec-amyloxy, and octadecyloxy. Z can be a monovalent aliphatic hydrocarboxy radical of 1 to 18 carbon atoms, such as methoxy, ethoxy, isopropoxy, allyloxy, propoxy, tertiary butoxy, hexoxy, cyclohexoxy, sec-amyloxy, and octadecyloxy; a monovalent acyloxy radical of 1 to 18 carbon atoms, such as $CH_3COO-$, $CH_3CH_2COO-$, $CH_3(CH_2)_{16}COO-$,

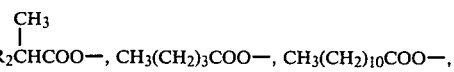

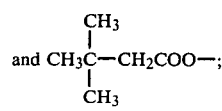

hydroxyl radicals; divalent oxygen atoms forming a Ti—O—Ti linkage; and when taken together form an alkanedioxy radical of the formula

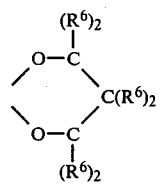

$R^6$ can be hydrogen atom and monovalent aliphatic hydrocarbon radicals having not more than 8 carbon atoms. The total number of carbon atoms in the alkanedioxy radical is not more than 18. The monovalent aliphatic hydrocarbon radicals can be, for example, alkyl radicals, such as methyl, ethyl, n-propyl, isopropyl, n-butyl, sec-butyl, isobutyl, tert-butyl, amyl, hexyl, octyl; alkenyl radicals, such as vinyl, allyl, n-heptenyl; and cycloalkyl radicals such as cyclopentyl, 1-cyclohexenyl, and 3-methyl-1-cyclohexenyl.

Preferred chelated titanium compounds are those in which Z is the isopropoxy radical or in which the two Z radicals together are the 1,3-propanedioxy radical. The preferred chelating radicals are acetylacetonato radical having the formula

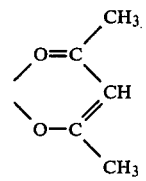

and ethylacetoacetato radical having the formula

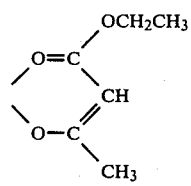

A preferred chelated titanium compound is 1,3-propanedioxy-bis(ethylacetoacetato)titanium and a most preferred compound is diisopropoxy-bis(ethylacetoacetato)titanium.

A chelated titanium compound with a Gardner Color of less than 13 produces an acceptable silicone elastomeric composition having a Gardner Color of 5 or less. The Gardner Color is determined by comparing the color of a sample to the color of a set of standard colors varying from clear to yellow to brown as described in ASTM D 1544. The higher the number, the darker the color.

The additives useful in this invention are those materials which are soluble in the chelated titanium compound and are selected from the group consisting of (1) esters of thioalkanoic acids, (2) di-tertiary-butyl phenol containing compounds, (3) organic phosphites, and (4) mixtures of (2) and (3). As used in this application, the term "soluble" includes materials which are partially soluble, as well as those which are completely soluble.

Esters of thioalkanoic acids of the formula

wherein $R^8$ is an alkyl group containing from 1 to 15 inclusive carbon atoms and a is an integer of from 1 to 4 inclusive are useful in this invention. Many of these esters are commercially available such as 3,3'-didodecylthiodipropionate, dimethylthiodipropionate, diethylthiodipropionate, and dilaurylthiodipropionate.

The esters of thioalkanoic acid are chosen based upon their absence of color and their solubility in the chelated titanium compound being used. Esters which are not completely soluble have been used successfully, although they are not as efficient in preventing a change in color upon storage. A preferred ester of thioalkanoic acid is 3,3'-didodecylthiodipropionate.

Also useful in this invention are ditertiary butyl phenol containing compounds selected from the group consisting of 2,6-di-tert-butyl-4-methylphenol, tetrakis[methylene-3-(3',5'-di-tert-butyl-4'-hydroxyphenyl)propionate]methane, octadecyl-3-(3',5'-di-tert-butyl-4'-hydroxyphenyl)propionate, 4,4'-methylenebis(2,6-di-tert-butylphenol), 1,6-hexamethylene-bis-(3,5-di-tert-butyl-4-hydroxyhydrocinnamate), and thiodiethylene-bis-(3,5-di-tert-butyl-4-hydroxyhydrocinnamate). Preferred additives of this group are 2,6-di-tert-butyl-4-methylphenol and tetrakis[methylene-3-(3',5'-di-tert-butyl-4'-hydroxyphenyl)-propionate]methane. These materials are commercially available.

Organic phosphites which have been found useful in this invention include those of the formula $$(R^{10}O)_bP(OR^{11})_{3-b}$$

wherein $R^{10}$ and $R^{11}$ are selected from the group consisting of linear or branched alkyl radicals of from 1 to 18 carbon atoms, and phenyl radical, wherein b is 0 or 1.

Additional organic phosphites which have been found useful are those of the formula

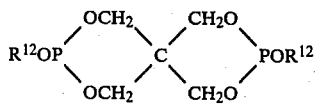

wherein $R^{12}$ is a linear or branched alkyl radical of from 1 to 18 carbon atoms. Many of the organic phosphites (3) are commercially available. Examples of the organic phosphites include phenyldiisodecylphosphite, diphenylisooctylphosphite, triisodecylphosphite, di(isodecyl)pentaerythritoldiphosphite and di(stearyl)pentaerythritoldiphosphite. A preferred additive is di(stearyl)pentaerythritoldiphosphite.

The additive can also be a mixture of one or more materials selected from the above ditertiary butyl phenol containing compounds of (2) and organic phosphites of (3). A mixture consisting of di(stearyl)pentaerythritoldiphosphite and tetrakis[methylene-3-(3',5'-di-tert-butyl-4'-hydroxyphenyl)propionate]methane has been shown to be particularly useful.

A composition of this invention is the product obtained by mixing a chelated titanium compound (a) of the formula shown above and from 1 to 100 parts by weight, based on 100 parts by weight of the chelated titanium compound, of an additive (b). The ratio of (a) to (b) in the composition is determined primarily by the amount of each ingredient desired in the silicone elastomeric composition in which they are to be used.

The chelated titanium compound (a) and the additive (b) can be mixed merely by adding the additive (b) in the desired quantity to the chelated titanium compound (a) and mixing. Because the chelated titanium compound reacts with moisture, such mixing must be carried out under conditions which substantially exclude moisture. The finished composition must be stored under conditions which substantially exclude moisture.

The additive (b) can also be added to the chelated titanium compound (a) during its manufacture. The chelated titanium compound of this invention can be prepared by adding a β-dicarbonyl compound of the formula

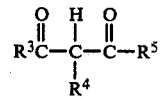

where $R^3$, $R^4$, and $R^5$ are as defined above, to a reactive titanium compound such as titanium orthoesters of aliphatic alcohols having from 1 to 18 inclusive carbon atoms. The reaction occurs spontaneously upon mixing. A preferred dicarbonyl compound is a lower alkyl ester of acetoacetic acid such as methylacetoacetate, ethylacetoacetate, and octylacetoacetate. The titanium orthoesters of aliphatic alcohols are exemplified by tetra-isopropoxytitanate, tetra-methoxytitanate, and tetraoctadecyloxytitanate.

The titanium containing composition of this invention can be produced be adding the additive (b) to the titanium orthoester of aliphatic alcohol as described above under conditions which substantially exclude moisture. Then the β-dicarbonyl compound is added at room temperature in an amount sufficient to give 2 moles of the beta-dicarbonyl compound per mole of titanium orthoester. The reaction will occur spontaneously. After the reaction is completed, the mixture is heated at reduced pressure to remove volatiles. The product is stored without exposure to moisture. The product is a dialkoxy titanium compound with the titanium in chelated form.

This dialkoxy titanium compound can be further reacted with an alkanediol of the formula

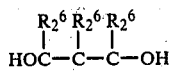

in which $R^6$ is as defined above. The alkanediol is added to the dialkoxy titanium compound in stoichiometric amounts. The mixture is heated at reduced pressure to remove the byproduct alcohol and drive the reaction to completion. The product is stored without exposure to moisture. Other methods of manufacturing various chelated titanium compounds of (a) are described in the above-incorporated references.

For purposes of discussing the use of the composition defined above which contains (a) and (b), this composition will be referred to as a titanium-containing composition.

This invention includes the use of the titanium-containing composition discussed above in an elastomeric composition comprising (i) a hydroxyl endblocked polydiorganosiloxane, (ii) a silane or silane mixture having an average of from 2.01 to 4 inclusive alkoxy radicals, and (a) a chelated titanium catalyst. By using the composition of this invention in place of the chelated titanium catalyst per se, the formation of color in the silicone elastomeric composition is inhibited.

The hydroxyl endblocked polydiorganosiloxane used in such silicone elastomeric compositions has a viscosity of at least 0.025 Pa.s at 25° C. and has the average formula

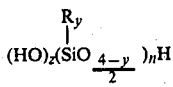

in which z has an average value from 1 to 1.01 inclusive, y has an average value from 1.99 to 2 inclusive, and the sum of y and z is 3, R is selected from the group consisting of monovalent hydrocarbon radicals, halogenated monovalent hydrocarbon radicals, and monovalent cyanoalkyl radicals, all of from 1 to 18 inclusive carbon atoms and n is an integer. R is preferably a methyl radical.

The silane or mixtures of silanes used has the average formula

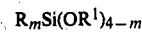

in which R is as defined above. $R^1$ is selected from the group consisting of monovalent haloaliphatic hydrocarbon radicals having no halogen alpha to the oxygen and monovalent aliphatic hydrocarbon radicals, both of less than 5 carbon atoms. The value of m is from 0 to 3, and has an average value of from 0 to 1.99 based upon the total amount of silane in the composition. When a silane is used where m has a value of 0 or 1, the silane acts as a cross-linking agent. When m has a value of 2, the silane is difunctional and acts as a chain-extending agent. In order for the silicone elastomeric composition to cure, the average value of m is from 0 to 1.99, with the preferred average value being about 1.0. The preferred silane is methyltrimethoxysilane.

Many of the one package, room temperature curing silicone elastomeric compositions now known and commercially available are catalyzed with chelated titanium compounds. Such curable silicone elastomeric compositions and methods for their manufacture are disclosed in U.S. Pat. No. 3,334,067, issued Aug. 1, 1967, to Weyenberg; U.S. Pat. No. 3,499,859, issued Mar. 10, 1970, to Matherly; U.S. Pat. No. 3,689,454, issued Sept. 5, 1972, to Smith and Hamilton, Jr.; U.S. Pat. No. 3,708,467 issued Jan. 2, 1973, to Smith and Beers; and U.S. Pat. No. 3,926,896, issued Dec. 16, 1975, to Dumoulin, all of which are hereby incorporated by reference to show silicone elastomeric compositions, in which the composition of this invention is useful, and methods of their manufacture.

The method of manufacturing the silicone elastomeric compositions which are stable under conditions excluding moisture, but which cure upon exposure to moisture comprises mixing hydroxyl endblocked polydiorganosiloxane, a silane or silane mixture having an average of from 2.01 to 4 inclusive alkoxy radicals, and a chelated titanium catalyst under conditions which substantially exclude moisture. When these ingredients are mixed, an interaction takes place that results in a material which is stable under conditions excluding moisture and which can be stored for prolonged periods of time. However, the material will cure spontaneously upon exposure to moisture, including atmospheric moisture, in a matter of a few minutes to a few hours to give a rubbery material. The nature of the product formed by mixing the three ingredients in the absence of moisture is not precisely known. However, it is believed that the alkoxy groups on the silane (ii) react with the hydroxyl groups of (i) to produce siloxanes of the structure

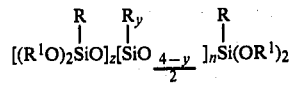

with the elimination of alcohol. Since the silanes tend to hydrolyze upon contact with moisture, care should be taken to exclude moisture during the mixing and subsequent storage of the mixture. It is preferred that at least 1.0 mole of silane (ii) is present for each mole of silicon-bonded hydroxyl in (i). The upper limit of the amount of silane employed is not critical. The use of greater than 1.0 mole of silane is preferred in order to protect the system from gelation due to the incidental presence of water which may be carried into the system by way of other ingredients such as fillers or stabilizing additives or which may diffuse into the system during storage.

To obtain a reasonable length of cure upon exposure to moisture, there should be sufficient titanium-containing composition of this invention to yield at least 0.1 part by weight of chelated titanium compound based on 100 parts by weight of (i). As much as 10 parts by weight of the chelated titanium compound or more can be used, but large amounts serve no useful purpose. Preferred amounts are in the range of from 0.5 part to 2.5 parts by weight.

When the titanium-containing composition of this invention is used in place of chelated titanium compounds previously used, the additive present in the titanium-containing composition inhibits the formation of color in the silicone elastomeric compositions. The amount of additive necessary in the silicone elastomeric composition is dependent upon, at least, the additive chosen, the amount and nature of the chelated titanium compound chosen, and the degree of color change allowable. As more additive is used, the color change upon storage becomes less.

The amount of an ester of thioalkanoic acid, additive (1), to be used is not narrowly critical. It is expected that levels as low as 0.05 part by weight of additive in a silicone elastomeric composition, based upon 100 parts by weight of the polydiorganosiloxane present in the composition, would be useful. Very high levels, as much as 10 parts of additive, would be unnecessarily expensive and would cause lower physical properties due to dilution by the additive. Amounts of from 0.2 to 0.8 part by weight are preferred.

The amount of di-tertiary-butyl phenol, additive (2), is not narrowly critical. It is expected that levels of from 0.015 part to 5 parts by weight of additive (2) in a silicone elastomeric composition, based upon 100 parts by weight of the polydiorganosiloxane present in the silicone elastomeric composition would be useful in inhibiting the formation of color upon storage. Amounts of from 0.1 part to 0.5 part by weight are preferred.

Amounts of from 0.001 part to 1 part by weight of organic phosphites of the above formula, additive (3), based upon 100 parts by weight of the polydiorganosiloxane present in the silicone elastomeric composition are useful in inhibiting the formation of color upon storage. Amounts of from 0.01 part to 0.2 part by weight are preferred.

Once the amounts of ingredients (a) and (b) desired in the silicone elastomeric composition are determined, the ratio of (a) to (b) in the titanium-containing composition of this invention is determined. A preferred titanium-containing composition is the product obtained by mixing 100 parts by weight of diisopropoxy bis(ethylacetoacetato)titanium with 10 parts by weight of di(stearyl)pentaerythritoldiphosphite.

Another composition of this invention is produced by mixing the titanium-containing composition (containing chelated titanium compound (a) and additive (b)) with the silane or silane mixture (ii). They are mixed together in the substantial absence of moisture. The amount of silane added to the titanium-containing composition may vary from 10 parts to 20,000 parts by weight based upon 100 parts by weight of the chelated titanium compound (a). Using the preferred ingredients, the amount of silane would vary from 100 to 1000 parts by weight of silane based upon 100 parts by weight of the chelated titanium compound (a). For use in a particular silicone elastomeric composition, the weight ratio of silane or silane mixture (ii) to (a) in the titanium-containing composition can be chosen to provide the relative amounts of each material desired in the final formulation of the silicone elastomeric composition.

The method of producing the silicone elastomeric composition is not critical, except the mixing must exclude substantial exposure to moisture. Preferably, the polydiorganosiloxane and filler are mixed, along with other ingredients such as anti-crepe hardening agents, other fillers, etc. This base mixture can be heated and/or placed under vacuum to remove any moisture present. The dried base mixture is then combined with the silane (ii), and the titanium-containing composition (iii) having additive present. Any other liquid additives can be conveniently added by mixing with (ii) and (iii) and then combining the total mix with the base mixture. The silane (ii), the chelated titanium compound (a), and the additive (b) can be added to the base mixture in any other desired order, either separately or in mixtures.

The silicone elastomeric composition can include other ingredients such as the fillers normally employed in silicone rubber, anticrepe-hardening agents to treat the filler, plasticizers to lower the durometer, and other ingredients to improve specific properties such as compression set additives, oxidation inhibitors, ultraviolet absorbers, and flame retardant additives. Care should be taken not to introduce appreciable amounts of moisture along with any of the added ingredients. The elastomeric composition can also be modified to reduce the time to cure by including a minor amount of carboxylic acid salt, alkoxide, and/or chelate of a metal ranging from lead to manganese, inclusive, in the electromotive series of metals.

The improved silicone elastomeric compositions of this invention are particularly useful where the composition is clear or translucent or of a light color. By using the titanium-containing composition of this invention in place of the chelated titanium catalyst per se in such silicone elastomeric compositions, the formation of color or a change of color upon storage is prevented or retarded. The silicone elastomeric compositions are useful in caulking applications, in coating applications, as adhesives, and as electrical insulation.

The following examples are included for illustrative purposes only and should not be construed as limiting the invention which is properly set forth in the appended claims. In the examples, all parts are parts by weight. The durometer was determined in accordance with ASTM D 2240, and tensile strength and elongation in accordance with ASTM D 412. Me represents the methyl radical and Et represents the ethyl radical.

EXAMPLE 1

A one package, room temperature curing silicone rubber was prepared with different additives to determine if the formation of a yellow color of the composition on storage could be prevented.

A base mixture was prepared by mixing in a dough type mixer 100 parts of a hydroxyl endblocked polydimethylsiloxane and a viscosity of 13.5 Pa.s at 25° C., 10 parts of fumed silica having a surface area of about 200 $m^2/g$, and 1.5 parts of a hydroxyl endblocked polymethylphenylsiloxane having about 4.5 weight percent hydroxyl radicals and a viscosity of about 0.5 Pa.s at 25° C., then passed once through a three roll mill. This mixture was then loaded into polyethylene tubes and deaired.

Eight parts of methyltrimethoxysilane, 2 parts of diisopropoxy-bis(ethylacetoacetato)titanium and the parts of additive shown in Table 1 were mixed and added to the mixture in the tubes. The crosslinker, catalyst, and additives were mixed together and added to the base mixture in the tube under conditions which essentially exclude moisture. After mixing of all ingredients, the tube was again deaired. The tubes were left at room temperature for 24 hours, then deaired.

After one week at room temperature, sample slabs were prepared by extruding some of the elastomeric composition from the tube onto a surface and spreading it to a uniform thickness of about 1.5 mm and allowing it to cure at 23° C. and 50% relative humidity. After aging other tubes 4 weeks at 70° C. to accelerate the aging effects upon storage, sample slabs were prepared as above for color determination.

The sample slabs prepared after one week at room temperature were observed for color and tested for physical properties.

A comparison was made of the color change between the samples cured after one week aging at room temperature and samples cured after four weeks aging at 70° C.

The samples were observed and their color recorded as shown in Table 1. Selected slabs were also compared for color using a Hellige-Gardner Color Comparator supplied by Sargent-Welch Scientific Co., Skokie, Ill. This instrument contains a graduation of shades from clear to dark brown with clear being number 1 and the shades darkening as the numbers rise. A reading of 6 to 7 is a definite yellow, while 2 to 3 is almost clear. An acceptable initial color is a Gardner Color of 2 or less.

A change in color of 2 to 4 is acceptable, while a color of 5 or above is not acceptable.

The order of the colors shown is (the first being the lightest) ivory, dark ivory, yellowish, light yellow, yellow, bright yellow, dark yellow, salmon, and brown.

EXAMPLE 2

A base mixture was prepared as in Example 1 except that 3 parts of the polymethylphenylsiloxane were used. Portions of the base were catalyzed as in Example 1 using the additives listed in Table 2. The various compositions were placed into tubes, aged, and slabs prepared and tested as in Example 1. The results are shown in Table 2.

TABLE 2

| Additive | Amount Parts | Color 1 wk./RT | Color 4 wk./70° C. | Gardner Color 1 wk./RT | Gardner Color 4 wk.70° C. |
|---|---|---|---|---|---|
| None* | — | Ivory | Yellow | 1-2 | 5-6 |
| Na$_2$SO$_3$* | 0.2 | Ivory | Yellow | 2-3 | 5-6 |
| NaOMe* | 0.2 | Ivory | Dk. Yellow | 1-2 | 8-9 |
| Benzoyl Peroxide* | 0.2 | Lt. Yellow | Dk. Yellow | 3-4 | 7-8 |
| 3,3'-didodecylthio-dipropionate | 0.2 | Ivory | Dk Ivory | 1-2 | 2-3 |
| 2,6-di-tert-butyl-4-methylphenol | 0.2 | Ivory | Dk. Ivory | 1-2 | 3-4 |
| Tetrakis[methylene-3-(3',5'-di-tert-butyl-4'-hydroxyphenyl)-propionate]methane | 0.2 | Ivory | Dk. Ivory | 1-2 | 3-4 |
| Triisodecylphosphite | 0.2 | Ivory | Yellowish | 1-2 | 4-5 |
| Triisodecylphosphite/tetrakis[methylene-3-(3',5-di-tert-butyl-4'-hydroxyphenyl)propionate]methane | 0.1/0.1 | Ivory | Dk. Ivory | 1-2 | 2-3 |
| Di(stearyl)pentaerythritol-diphosphite | 0.2 | Ivory | Ivory | 1-2 | 2-3 |
| Di(stearyl)pentaerythritol-diphosphite/tetrakis[methylene-3-(3',5'-di-tert-butyl-4'-hydroxyphenyl)propionate]methane | 0.1/0.1 | Ivory | Ivory | 1-2 | 1-2 |

*Comparative Example

EXAMPLE 3

A number of additives were screened for usefulness in one package, room temperature curing silicone elastomeric compositions by mixing 1.57 millimoles of the additive with 2 g of diisopropoxybis(ethylacetoacetato)titanium and 2 g of methyltrimethoxysilane. These mixtures were stored under conditions

TABLE 1

| Additive | Amount Parts | Color 1 wk./RT | Color 4 wk./70° C. | Gardner Color 1 wk/RT | Gardner Color 4 wk./70° C. |
|---|---|---|---|---|---|
| None* | — | Ivory | Yellow | 2-3 | 5-6 |
| Na$_2$SO$_3$* | 0.25 | Ivory | Yellow | 3-4 | 5-6 |
| NaOMe* | 0.08 | Ivory | Yellow | 2-3 | 6-7 |
| Benzoyl Peroxide* | 0.44 | Lt. Yellow | Dk. Yellow | 3-4 | 8-9 |
| (EtO)$_3$ P | 0.26 | Ivory | Dk. Ivory | 2-3 | 3-4 |
| 4,4'-thiobis(6-tert-butyl-metacresol)* | 0.56 | Salmon | Brown | 12-13 | 12-13 |
| 3,3'-didodecylthiodi-propionate | 0.81 | Ivory | Dk. Ivory | 1-2 | 2-3 |
| 2,6-di-tert-butyl-4-methylphenol | 0.38 | Ivory | Dk. Ivory | 1-2 | 3-4 |
| 4-dodecyloxy-2-hydroxy-benzophenone* | 0.61 | Bright | Yellow | 7-8 | 9-10 |
| Tetrakis[methylene-3-(3',5'-di-t-butyl-4'-hydroxyphenyl)propionate]-methane | 0.42 | Ivory | Dk. Ivory | 2-3 | 3-4 |
| 2-hydroxy-4-methoxy-benzophenone* | 0.36 | Bright Yellow | Yellow | 8-9 | 10-11 |
| (EtO)$_3$ P/tetrakis-[methylene-3-(3',5'-di-tert-butyl-4'-hydroxy-phenyl)propionate]methane | 0.14/0.21 | Ivory | Dk. Ivory | 2-3 | 4-5 |

*Comparative Example excluding moisture for one month at room temperature, then observed for evidence of instability. The results are shown in Table 3. Suitable additives would be those which did not become darker or precipitate.

The initial color was compared to the control with no additive. Slightly darker (Sl.Dkr) means slightly darker than the control. Lighter means lighter than the control. Same means same color as the control. V.Dk.Red is very dark red. Blk. is black. Brn. is brown. Dr.Brn. is dark brown. After 1 month, the color was compared to the original color of that sample.

The tendency to precipitate is shown as slight precipitate (Sl.Ppt.), some precipitate (Some Ppt.), and much precipitate (Much Ppt.).

titanium catalyst was replaced with a titanium-containing composition containing 90 weight percent of diisopropoxybis(ethylacetoacetato)titanium and 10 weight percent of di(stearyl)pentaerythritoldiphosphite to give Sample 2. This titanium-containing composition, prepared by mixing the additive into the titanate, had a Gardner Color of 9 to 10.

A third portion of the base mixture was catalyzed identically to the second portion except the additive was added to the chelated titanium compound during its manufacture, as described below, to give Sample 3.

A 1-liter, 3-neck round bottom flask was fitted with a thermometer, stirrer, and addition funnel, and kept under positive nitrogen pressure. To 238 g of tetraiso-

TABLE 3

| Additive | Amount g | Color Initial | After 1 Mo. | Precipitate | Suitable |
|---|---|---|---|---|---|
| None* | — | — | No Change | — | — |
| Na₃SO₃* | 0.20 | Sl. Dkr. | No Change | Sl. Ppt. | no |
| NaOMe* | 0.072 | Sl. Dkr. | No Change | Sl. Ppt. | no |
| Benzoyl Peroxide* | 0.45 | Lighter | Red-Brn. | Some Ppt. | no |
| (EtO)₃ P | 0.26 | Same | No Change | — | yes |
| 4,4'-thiobis(6-tert-butyl-metacresol)* | 0.53 | V. Dk. Red | — | — | no |
| 3,3'-diotadecylthiodipropionate* | 1.07 | Lighter | No Change | Much Ppt. | no |
| 3,3'-didodecylthiodipropionate | 0.81 | Lighter | No Change | Sl. Ppt. | yes |
| Diphenylamine/acetone product* | 0.36 | Blk. | No Change | — | no |
| 2,6-di-tert-butyl-4-methylphenol | 0.40 | Sl. Dkr. | No Change | — | yes |
| Polymerized trimethyldihydroquinoline* | 0.27 | Brn. | No Change | — | no |
| Sym-di-beta-naphthyl-p-phenylenediamine* | 0.57 | Dk. Brn. | No Change | Much Ppt. | no |
| 4-dodecyloxy-2-hydroxy-benzophenone*# | 0.60 | Sl. Dkr. | No Change | — | no |
| Polymerized 1,2-dihydro-2,-2,4-trimethylquinoline* | 0.27 | Dk. Brn. | No Change | Sl. Ppt. | no |
| Tetrakis[methylene-3(3',-5'-di-tert-butyl-4'-hydroxyphenyl)-propionate]methane | 0.42 | Same | No Change | Some Ppt. | yes |
| 2,2'-dihydroxy-4,4'-dimethoxy-benzophenone* | 0.43 | Red | No Change | Sl. Ppt. | no |
| 2-hydroxy-4-methoxy-benzophenone*# | 0.36 | Sl. Dkr. | No Change | — | no |

*Comparative Example
turn bright yellow in sealant

EXAMPLE 4

A series of one package, room temperature curing silicone elastomeric compositions were prepared to compare the method of addition of the additive used to prevent color formation.

A base mixture was prepared following the procedure of Example 1 by mixing 30 parts of hydroxyl endblocked polydimethylsiloxane having a viscosity of about 4.0 Pa.s at 25° C., 70 parts of hydroxyl endblocked polydimethylsiloxane having a viscosity of about 50 Pa.s at 25° C., 1.5 parts of the polymethylphenylsiloxane of Example 1 and 14 parts of the fumed silica of Example 1.

A first portion of the base mixture was catalyzed following the procedure of Example 1 using a mixture of 9 parts of methyltrimethoxysilane, 2 parts of diisopropoxybis(ethylacetoacetato)tinanium, 0.02 pt. of dibutyltindioctoate and 0.2 pt. of (CH₃O)₃. Si(CH₂)₃HNCH₂CH₂NH₂ to give Sample 1.

A second portion of the base mixture was catalyzed as above with a similar mixture except the chelated propyltitanate in the flask was added 35.53 g of di(-stearyl)pentaerythritoldiphosphite. Then 218.1 g of CH₃COCH₂CO₂(CH₂CH₃) was added through the addition funnel over a 41-minute time period. The temperature rose to 49° C. The reaction mixture sat overnight at room temperature without apparent change, then was heated to 50° C. and the volatiles removed at reduced pressure at a temperature of 68° C. When cooled to room temperature, the product was a lemon-yellow slush which later solidified. This titanate-additive mixture had a Gardner value of 10.

Tubes of each of the above silicone elastomeric compositions were then aged for comparisons of cured properties and color after aging periods as shown in Table 4. After each aging period, slabs were prepared and tested as in Example 1 with the results shown in Table 4.

The tubes containing the chelated titanium catalyst alone colored to an unacceptable degree upon aging for 12 weeks at 50° C. Those tubes containing the additive still had acceptable color after 17 weeks at 50° C. aging.

The slabs containing the additive also retained a higher precentage of their original tensile strength.

TABLE 4

| Aging | Sample | Durometer | Tensile Strength, MPa | Elongation % | 200% Modulus, MPa | % Retention of Tensile Strength | Gardener Color |
|---|---|---|---|---|---|---|---|
| 1 Wk. | 1* | 30 | 2.09 | 498 | 0.91 | — | 2-3 |
| RT | 2 | 28 | 1.57 | 477 | 0.78 | — | 1-2 |
|  | 3 | 30 | 1.50 | 461 | 0.77 | — | 2-3 |
| 1 Wk. | 1* | 24 | 1.99 | 485 | 0.90 | 95 | 2-3 |
| 50° C. | 2 | 20 | 1.50 | 469 | 0.77 | 96 | 1-2 |
|  | 3 | 23 | 1.55 | 481 | 0.76 | 103 | 2-3 |
| 4 Wk. | 1* | 25 | 1.60 | 526 | 0.76 | 76 | 3-4 |
| 50° C. | 2 | 24 | 1.22 | 537 | 0.65 | 78 | 2-3 |
|  | 3 | 21 | 1.22 | 515 | 0.64 | 81 | 2-3 |
| 12 Wk. | 1* | 17 | 0.48 | 249 | — | 23 | 6-7 |
| 50° C. | 2 | 16 | 0.40 | 178 | — | 25 | 2-3 |
|  | 3 | 17 | 0.42 | 222 | — | 28 | 2-3 |
| 17 Wk. | 1* | — | — | — | — | — | 6-7 |
| 50° C. | 2 | — | — | — | — | — | 1-2 |
|  | 3 | — | — | — | — | — | 2-3 |

*Comparative Example

EXAMPLE 5

The effect of various amounts of additive added to a chelated titanium catalyst, diisopropoxy-bis-(ethylacetoacetato)titanium, were evaluated.

A new sample of diisopropoxy-bis-(ethylacetoacetato)titanium was prepared. Immediately after preparation varying amounts of these different additives were mixed into the chelated titanium catalyst to prevent the formation of color on storage. Additive A was di(stearyl)pentaerythritoldiphosphite. Additive B was the same as Additive A, but it also contained approximately 1 weight percent of triisopropanol amine as an incidental ingredient. Additive C was a mixture of 2 parts by weight of Additive A and 1 part by weight of tetrakis[methylene-3-(3',5'-di-tert-butyl-4'-hydroxyphenyl)propionate]methane. The amounts of additive used are shown in Table 5 as a percent of the chelated titanium catalyst.

A series of one package, room temperature curing silicone elastomeric compositions were prepared as in Example 4 except they were catalyzed with the chelated titanium plus additive as prepared in this example and shown in Table 5 in place of the chelated titanium catalyst. The tubes of catalyzed silicone elastomeric composition were then aged, then prepared into test slabs and tested as in Example 1. The color and physical properties of the various slabs were as shown in Table 5.

The slabs containing the higher levels of additive showed less color change. The mixed additives B and C did not show advantages over A alone.

EXAMPLE 6

Two identical silicone elastomeric compositions were prepared that were similar in composition to that of Example 4. The first composition was catalyzed with 1 part chelated titanium catalyst. The second composition was catalyzed with 1 part of the same chelated titanium catalyst plus a mixture of 0.1 part of di(stearyl)pentaerythritoldiphosphite and 0.1 part of tetrakis[methylene-3-(3',5'-di-tert-butyl-4'-hydroxyphenyl)propionate]methane. After aging the tubes for 2 weeks at 70° C., sample slabs were prepared as in Example 1. The slab made of the material containing the additive mixture had not discolored, while the control containing no additive had yellowed.

That which is claimed is:

1. A composition consisting essentially of the product obtained by mixing, under conditions which substantially exclude moisture, (a) a chelated titanium compound having a formula

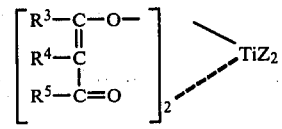

in which
$R^3$ is a monovalent hydrocarbon radical having from 1 to 18 inclusive carbon atoms,

TABLE 5

| | | | Physical Properties | | | | |
|---|---|---|---|---|---|---|---|
| | | | Original | | | Aged 4 weeks at 50° C. | |
| Additive | Amt. Percent | Gardner Color* | Durometer Shore A | Tensile Strength MPa | Elongation Percent | Tensile MPa | Elongation Percent |
| A | 0.5 | 4-5 | 24 | 1.49 | 458 | 1.16 | 450 |
|  | 1.0 | 4-5 | 27 | 1.65 | 546 | 1.31 | 420 |
|  | 3.0 | 1-2 | 26 | 1.54 | 503 | 1.45 | 552 |
|  | 5.0 | 1-2 | 25 | 1.47 | 509 | — | — |
| B | 1.0 | 4-5 | 27 | 1.54 | 452 | 1.03 | 468 |
|  | 5.0 | 1-2 | 25 | 1.32 | 446 | 1.12 | 479 |
| C | 0.5 | 4-5 | 25 | 1.59 | 504 | 1.07 | 463 |
|  | 1.0 | 4-5 | 26 | 2.07 | 505 | 1.06 | 470 |
|  | 3.0 | 2-3 | 28 | 1.53 | 542 | 1.02 | 465 |

*Color of composition, when cured, after aging for 9 weeks at 50° C. before curing R$^4$ is a monovalent radical selected from the group consisting of hydrocarbon radicals having from 1 to 18 carbon atoms, and hydrogen, R$^5$ is a monovalent radical selected from the group consisting of hydrocarbon radicals and aliphatic hydrocarbonoxy radicals each having from 1 to 18 inclusive carbon atoms, and Z is a radical selected from the group consisting of monovalent aliphatic hydrocarbonoxy radicals and monovalent acyloxy radicals, each having from 1 to 18 inclusive carbon atoms; hydroxyl radical; divalent oxygen atoms forming a TiOTi linkage; and when taken together form an alkanedioxy radical of the formula

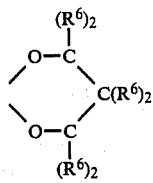

in which

R$^6$ is a radical selected from the group consisting of hydrogen atom and monovalent aliphatic hydrocarbon radicals having not more than 8 carbon atoms, the total number of carbon atoms in the alkanedioxy radical is not more than 18, and (b) from 1 to 100 parts by weight based on 100 parts by weight of (a), of an additive soluble in the chelated titanium compound and being (1) an ester of thioalkanoic acid of the formula

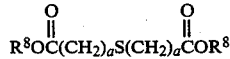

wherein R$^8$ is an alkyl group containing from 1 to 15 inclusive carbon atoms and a is an integer of from 1 to 4 inclusive, (2) di-tertiary-butyl phenol containing compounds selected from the group consisting of 2,6-di-tert-butyl-4-methylphenol, tetrakis[methylene-3-(3',5'-di-tert-butyl-4'-hydroxyphenyl)propionate]methane, octadecyl-3-(3',5'-di-tert-butyl-4'-hydroxyphenyl)propionate, 4,4'-methylene-bis(2,6-di-tert-butylphenol), 1,6-hexamethylene-bis-(3,5-di-tert-butyl-4-hydroxyhydrocinnamate), and thiodiethylene-bis-(3,5-di-tert-butyl-4-hydroxyhydrocinnamate), (3) an organic phosphite selected from the group consisting of the formula

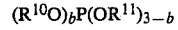

wherein R$^{10}$ and R$^{11}$ are selected from the group consisting of linear or branched alkyl radicals of from 1 to 18 carbon atoms, and phenyl radical, wherein b is 0 or 1, and the formula

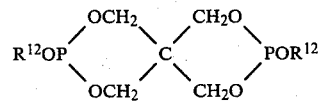

wherein R$^{12}$ is a linear or branched alkyl radical of from 1 to 18 carbon atoms, or (4) a mixture of (2) and (3), the composition having a color of less than 13 as determined by the Gardner Color Scale and being stored under conditions substantially excluding moisture.

2. The composition of claim 1 in which Z is isopropoxy radical.

3. The composition of claim 1 in which Z$_2$ is 1,3-propanedioxy radical.

4. The composition of claim 1 in which R$^3$ is methyl, R$^4$ is hydrogen, and R$^5$ is methyl.

5. The composition of claim 1 in which (a) is diisopropoxy-bis(ethylacetoacetato)titanium.

6. The composition of claim 1 in which (a) is 1,3-propanedioxy-bis(ethylacetoacetato)titanium.

7. The composition of claim 5 or 6 in which (b) is an ester of thioalkanoic acid of (1).

8. The composition of claim 5 or 6 in which (b) is a di-tertiary-butyl phenol of (2).

9. The composition of claim 5 or 6 in which (b) is an organic phosphite of (3).

10. The composition of claim 5 or 6 in which (b) is a mixture of a di-tertiary-butyl phenol of (2) and an organic phosphite of (3).

11. The composition of claim 9 in which (3) is di(-stearyl)pentaerythritoldiphosphite.

12. The composition of claim 1 also containing from 10 to 20,000 parts by weight of a silane or silane mixture of the average formula

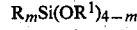

in which

R is selected from the group consisting of monovalent hydrocarbon radicals, halogenated monovalent hydrocarbon radicals, and monovalent cyanoalkyl radicals, all of from 1 to 18 inclusive carbon atoms, R$^1$ is selected from the group consisting of monovalent haloaliphatic hydrocarbon radicals having no halogen alpha to the oxygen and monovalent aliphatic radicals, both less than 5 carbon atoms, and m is from 0 to 3 and having an average value of from 0 to 1.99.

13. A method of producing a titanium-containing composition with a reduced tendency to become colored upon storage consisting essentially of mixing under conditions substantially excluding moisture (a) a chelated titanium compound having a formula

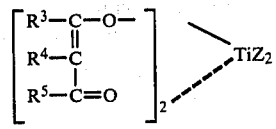

in which

R$^3$ is a monovalent hydrocarbon radical having from 1 to 18 inclusive carbon atoms, R$^4$ is a monovalent radical selected from the group consisting of hydrocarbon radicals having from 1 to 18 carbon atoms, and hydrogen, R$^5$ is a monovalent radical selected from the group consisting of hydrocarbon radicals and aliphatic hydrocarbonoxy radicals each having from 1 to 18 inclusive carbon atoms, and Z is a radical selected from the group consisting of monovalent aliphatic hydrocarbonoxy radicals and monovalent acyloxy radicals, each having from 1 to 18 inclusive carbon atoms; hydroxyl radical; divalent oxygen atoms forming a TiOTi linkage; and when taken together form an alkanedioxy radical of the formula

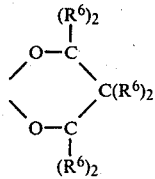

in which

R⁶ is a radical selected from the group consisting of hydrogen atom and monovalent aliphatic hydrocarbon radicals having not more than 8 carbon atoms, the total number of carbon atoms in the alkanedioxy radical is not more than 18, and (b) from 1 to 100 parts by weight based on 100 parts by weight of (a), of an additive soluble in the chelated titanium compound and being (1) an ester of thioalkanoic acid of the formula

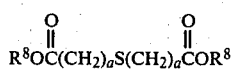

wherein $R^8$ is an alkyl group containing from 1 to 15 inclusive carbon atoms and a is an integer of from 1 to 4 inclusive, (2) di-tertiary-butyl phenol containing compounds selected from the group consisting of 2,6-di-tert-butyl-4-methylphenol, tetrakis[methylene-3-(3',5'-di-tert-butyl-4'-hydroxyphenyl)propionate]methane, octadecyl-3-(3',5'-di-tert-butyl-4'-hydroxyphenyl)propionate, 4,4'-methylene-bis(2,6-di-tert-butylphenol), 1,6-hexamethylene-bis-(3,5-di-tert-butyl-4-hydroxyhydrocinnamate), and thiodiethylene-bis-(3,5-di-tert-butyl-4-hydroxyhydrocinnamate), (3) an organic phosphite selected from the group consisting of the formula

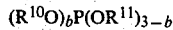

wherein $R^{10}$ and $R^{11}$ are selected from the group consisting of linear or branched alkyl radicals of from 1 to 18 carbon atoms, and phenyl radical, wherein b is 0 or 1, and the formula

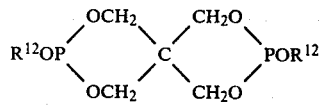

wherein $R^{12}$ is a linear or branched alkyl radical of from 1 to 18 carbon atoms, or (4) a mixture of a di-tertiary-butyl phenol of (2) and an organic phosphite of (3), and storing under conditions substantially excluding moisture, the product having a color of less than 13 as determined by the Gardner Color Scale.

14. A method of producing a titanium-containing composition with a reduced tendency to become colored upon storage consisting essentially of mixing, under conditions which substantially exclude moisture, 100 parts by weight of a titanium orthoester of an aliphatic alcohol having from 1 to 18 inclusive carbon atoms, and from 1 to 100 parts by weight of an additive being (1) an ester of thioalkanoic acid of the formula

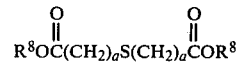

wherein $R^8$ is an alkyl group containing from 1 to 15 inclusive carbon atoms and a is an integer of from 1 to 4 inclusive, (2) di-tertiary-butyl phenol containing compounds selected from the group consisting of 2,6-di-tert-butyl-4-methylphenol, tetrakis[methylene-3-(3',5'-di-tert-butyl-4'-hydroxyphenyl)propionate]methane, octadecyl-3-(3',5'-di-tert-butyl-4'-hydroxyphenyl)propionate, 4,4'-methylene-bis(2,6-di-tert-butylphenol), 1,6-hexamethylene-bis-(3,5-di-tert-butyl-4-hydroxyhydrocinnamate), and thiodiethylene-bis-(3,5-di-tert-butyl-4-hydroxyhydrocinnamate), (3) an organic phosphite selected from the group consisting of the formula

wherein $R^{10}$ and $R^{11}$ are selected from the group consisting of linear or branched alkyl radicals of from 1 to 18 carbon atoms, and phenyl radical, wherein b is 0 or 1, and the formula

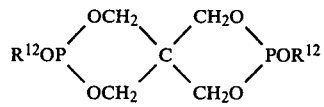

wherein $R^{12}$ is a linear or branched alkyl radical of from 1 to 18 carbon atoms, or (4) a mixture of a di-tertiary-butyl phenol of (2) and an organic phosphite of (3), then adding a beta-dicarbonyl compound of the formula

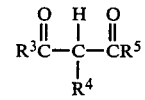

in which $R^3$ is a monovalent hydrocarbon radical having from 1 to 18 inclusive carbon atoms, $R^4$ is a monovalent radical selected from the group consisting of hydrocarbon radicals having from 1 to 18 carbon atoms, and hydrogen, $R^5$ is a monovalent radical selected from the group consisting of hydrocarbon radicals and aliphatic hydrocarbonoxy radicals each having from 1 to 18 inclusive carbon atoms, and in an amount sufficient to give 2 moles of the beta-dicarbonyl compound per mole of titanium orthoester, then heating at reduced pressure to remove volatiles, the product being a mixture of dialkoxy titanium compound and additive, having a color of less than 13 as determined by the Gardner Color Scale and being stored under conditions substantially excluding moisture.

15. The method of claim 14 in which the product is further reacted with an alkanediol of the formula

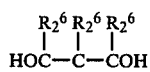

in which

R$^6$ is a radical selected from the group consisting of hydrogen atom and monovalent aliphatic hydrocarbon radicals having not more than 8 carbon atoms, the total number of carbon atoms in the alkanediol being not more than 18 there being a stoichiometric amount of alkanediol present to react with the dialkoxy titanium compound of claim 14, then heating at reduced pressure to remove volatiles, the product having a color of less than 13 as determined by the Gardner Color Scale and being stored under conditions substantially excluding moisture.

UNITED STATES PATENT AND TRADEMARK OFFICE
CERTIFICATE OF CORRECTION

PATENT NO. : 4,482,498  Page 1 of 2

DATED : November 13, 1984

INVENTOR(S) : James R. Falender, Angelika H. McHale

It is certified that error appears in the above-identified patent and that said Letters Patent is hereby corrected as shown below:

In column 1, line 60,

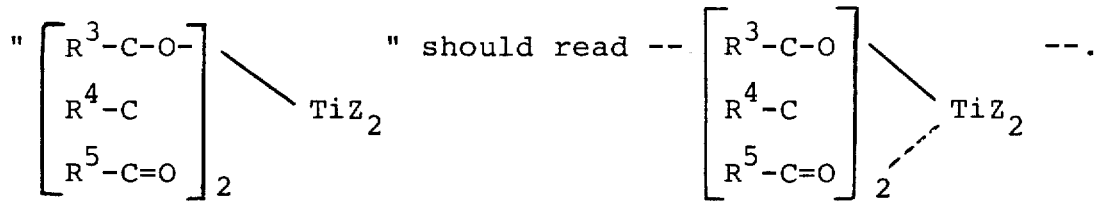

In column 1, line 68, "carbn" should read -- carbon --.

In column 3, line 8, "moixture" should read -- moisture --.

In column 12, line 26 (Table 2, the "Additive" column), "(3',5-di-tert-butyl-4'-" should read --(3',5'-di-tert-butyl-4'- --.

UNITED STATES PATENT AND TRADEMARK OFFICE
CERTIFICATE OF CORRECTION

PATENT NO. : 4,482,498

DATED : November 13, 1984

INVENTOR(S) : James R. Falender, Angelika H. McHale

It is certified that error appears in the above-identified patent and that said Letters Patent is hereby corrected as shown below:

In column 11, line 57, (Table 1, 3rd column)
   "Bright" should read -- Bright Yellow --.

In column 13, line 25 (Table 3, the "Additive" column),
      "3,3'-diotadecylthiodi-" should read
   -- 3,3'-dioctadecylthiodi- --.

In column 13, line 64, "tinanium" should read -- titanium --.

In column 15, line 5 (Table 4, last column heading),
   "Gardener" should read -- Gardner --.

Signed and Sealed this

Sixteenth Day of April 1985

[SEAL]

Attest:

DONALD J. QUIGG

Attesting Officer

Acting Commissioner of Patents and Trademarks